United States Patent
Chauvel et al.

(10) Patent No.: US 7,574,584 B2
(45) Date of Patent: Aug. 11, 2009

(54) SPLITTING EXECUTION OF A FLOATING-POINT ADD INSTRUCTION BETWEEN AN INTEGER PIPELINE FOR PERFORMING MANTISSA ADDITION AND A HARDWARE STATE MACHINE

(75) Inventors: Gerard Chauvel, Antibes (FR); Maija Kuusela, Mouans Sartoux (FR)

(73) Assignee: Texas Instruments Incorporated, Dallas, TX (US)

( * ) Notice: Subject to any disclaimer, the term of this patent is extended or adjusted under 35 U.S.C. 154(b) by 491 days.

(21) Appl. No.: 11/186,239

(22) Filed: Jul. 21, 2005

(65) Prior Publication Data

US 2006/0026393 A1 Feb. 2, 2006

(30) Foreign Application Priority Data

Jul. 27, 2004 (EP) .................. 04291918

(51) Int. Cl.
*G06F 9/00* (2006.01)
*G06F 7/42* (2006.01)

(52) U.S. Cl. ...................... 712/222; 708/505

(58) Field of Classification Search ............... 708/490, 708/495, 497, 498, 503, 505, 508, 204; 712/221, 712/222

See application file for complete search history.

(56) References Cited

U.S. PATENT DOCUMENTS

| | | | | |
|---|---|---|---|---|
| 4,598,365 A | * | 7/1986 | Boothroyd et al. | 712/221 |
| 5,257,215 A | * | 10/1993 | Poon | 708/204 |
| 5,272,660 A | * | 12/1993 | Rossbach | 708/504 |
| 5,337,265 A | * | 8/1994 | Desrosiers et al. | 708/505 |
| 5,923,871 A | * | 7/1999 | Gorshtein et al. | 712/221 |
| 6,085,208 A | * | 7/2000 | Oberman et al. | 708/205 |
| 6,148,316 A | * | 11/2000 | Herbert et al. | 708/505 |
| 6,684,232 B1 | * | 1/2004 | Handlogten et al. | 708/204 |

* cited by examiner

*Primary Examiner*—David J Huisman
(74) *Attorney, Agent, or Firm*—Lawrence J. Bassuk; W. James Brady; Frederick J. Telecky, Jr.

(57) ABSTRACT

In some embodiments, a processor includes fetch logic that fetches instructions, an integer pipeline, and a hardware state machine that is separate from and interacts with the integer pipeline. The instruction is executed partly in the integer pipeline according to software and partly in the hardware state machine. For a floating point add instruction, mantissa addition is executed in the integer pipeline and the plurality of operations performed by the hardware state machine includes testing of exponents, testing for overflow and underflow conditions, packing, and rounding detection.

18 Claims, 7 Drawing Sheets

| R0 | GENERAL PURPOSE (GP) |
| R1 | GENERAL PURPOSE (GP) |
| R2 | GENERAL PURPOSE (GP) |
| R3 | GENERAL PURPOSE (GP) |
| R4 | GENERAL PURPOSE (GP) |
| R5 | GENERAL PURPOSE/LOCAL VARIABLE POINTER (LV) |
| R6 | STACK POINTER (SP) |
| R7 | TOP OF STACK (ToS) |
| R8 | GENERAL PURPOSE (GP) |
| R9 | GENERAL PURPOSE (GP) |
| R10 | GENERAL PURPOSE (GP) |
| R11 | GENERAL PURPOSE (GP) |
| R12 | GENERAL PURPOSE (GP) |
| R13 | GENERAL PURPOSE (GP) |
| R14 | GENERAL PURPOSE (GP) |
| R15 | STATUS AND CONTROL (ST) |

SPLITTING EXECUTION OF A FLOATING-POINT ADD INSTRUCTION BETWEEN AN INTEGER PIPELINE FOR PERFORMING MANTISSA ADDITION AND A HARDWARE STATE MACHINE

CROSS-REFERENCE TO RELATED APPLICATIONS

This application claims priority to European Patent Application No. 04291918.3, filed Jul. 27, 2004, and which is incorporated by reference herein as if reproduced in full below.

BACKGROUND OF THE INVENTION

1. Technical Field

The present subject matter relates generally to processors and more particularly to splitting the execution of instructions (e.g., floating point instructions) between hardware and software.

2. Background Information

Many types of electronic devices are battery operated and thus preferably consume as little power as possible. An example is a cellular telephone. Further, it may be desirable to implement various types of multimedia functionality in an electronic device such as a cell phone. Examples of multimedia functionality may include, without limitation, games, audio decoders, digital cameras, etc. It is thus desirable to implement such functionality in an electronic device in a way that, all else being equal, is fast, consumes as little power as possible and/or requires as little memory as possible. Improvements in this area are desirable.

BRIEF SUMMARY

In some embodiments, a processor comprises fetch logic that fetches instructions, an integer pipeline, and a hardware state machine that is separate from and interacts with the integer pipeline. The instruction is executed partly in the integer pipeline according to software and partly in the hardware state machine. Another embodiment comprises a method that includes fetching an instruction, executing the instruction partially in a hardware state machine; and executing the instruction partially in an integer pipeline.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections. The term "system" refers broadly to a collection of two or more components and may be used to refer to an overall system (e.g., a communication system such as a cellular telephone) as well as a subsystem (e.g., a processor) provided as part of a larger system.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
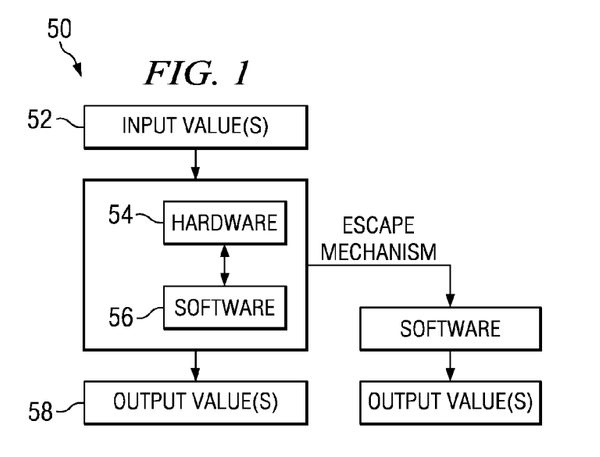
FIG. 1 shows a system in accordance with embodiments of the invention.

FIG. 1 illustrates the split execution of an instruction concurrently by specialized hardware and software executed in a processor pipeline. System 50 comprises hardware execution portion 54 and software execution portion 56. Either or both of the hardware 54 and software 56 receive one or more input values 52, process the input values, and generate one or more output values 58. In the exemplary system shown in FIG. 1, the input values 52 are received by the hardware 54. In general, the combination of hardware 54 and software 56 functions to execute an instruction. In some embodiments as will be explained below, the system 50 is implemented in a processor. The hardware 54 comprises a hardware state machine and the software 56 comprises instructions executed on an integer pipeline. The system 50 thus comprises a hardware state machine that is separate from and interacts with an integer pipeline. The instruction is executed partly in the integer pipeline (software 56) according to software and partly in the hardware state machine (hardware 54). In preferred embodiments, the two execution flows 54 and 56 are coupled by tight scheduling constraints and the by-pass of intermediate results as explained below. Additionally, there is an escape mechanism, which breaks from the parallel execution model and continues the execution with a pure software flow.

Various values are passed from the hardware 54 to the software 56 and vice versa as desired to execute the instruction. The instruction initiates a series of concurrent, mutually coordinated operations in the hardware 54 and in software 56 to at least partially execute the instruction. In this manner (coordinated interaction between hardware and software), an instruction may be executed more cost efficiently but still preserving satisfactory performance than if the instruction was executed exclusively in software or exclusively in hardware. Any of a variety of instructions can be split between hardware and software. Examples include floating point multiply instructions, floating point add instructions, floating point-to-integer conversion instructions, integer-to-floating point conversion instructions, and floating point compare instructions.

In at least some embodiments, one or more instructions are executed by a programmable electronic device such as a processor. The processor described herein is particularly suited for executing Java™ Bytecodes or comparable code. As is well known, Java is particularly suited for embedded applications. Java is a relatively "dense" language meaning that on average each instruction may perform a large number of functions compared to various other programming languages. The dense nature of Java is of particular benefit for portable, battery-operated devices that preferably include as little memory as possible to save space and power. The reason, however, for executing Java code is not material to this disclosure or the claims which follow. Further, the processor advantageously includes one or more features that permit the execution of the Java code to be accelerated.

Figure 2:
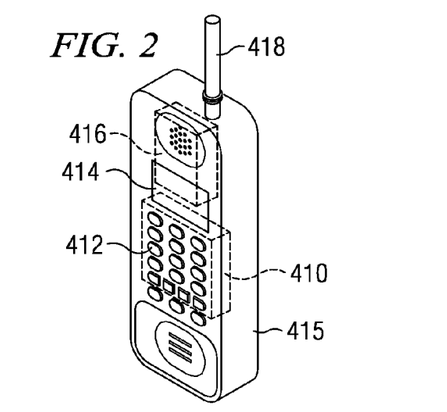
FIG. 2 illustrates an exemplary battery-operated, communication system.

The processor may, for example, be incorporated into a portable, battery-operated, communication device (e.g., a cellular telephone) such as that shown in FIG. 2. As shown, the mobile communication device 415 includes an integrated keypad 412 and display 414. The processors described below and other components may be included in electronics package 410 connected to the keypad 412, display 414, and radio frequency ("RF") circuitry 416. The RF circuitry 416 may be connected to an antenna 418. The electronics package 410 may comprise the processor described herein.

Figure 3:
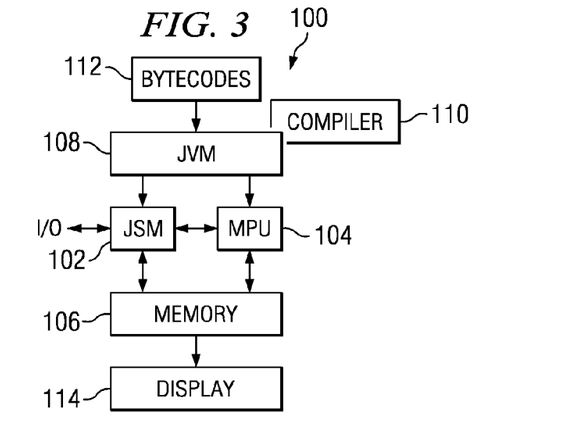
FIG. 3 shows a diagram of a system in accordance with preferred embodiments of the invention and including a Java Stack Machine ("JSM") and a Main Processor Unit ("MPU")

Referring now to FIG. 3, a system 100 is shown in accordance with a preferred embodiment of the invention. As shown, the system includes at least two processors 102 104. Processor 102 is referred to for purposes of this disclosure as a Java Stack Machine ("JSM") and processor 104 may be referred to as a Main Processor Unit ("MPU"). System 100 may also include memory 106 coupled to both the JSM 102 and MPU 104 and thus accessible by both processors. At least a portion of the memory 106 may be shared by both processors meaning that both processors may access the same shared memory locations. Further, if desired, a portion of the memory 106 may be designated as private to one processor or the other. System 100 also includes a Java Virtual Machine ("JVM") 108, compiler 110, and a display 114. The MPU 104 preferably includes an interface to one or more input/output ("I/O") devices such as a keypad to permit a user to control various aspects of the system 100. In addition, data streams may be received from the I/O space into the JSM 102 to be processed by the JSM 102. Other components (not specifically shown) may be included as desired for various applications.

As is generally well known, Java code comprises a plurality of "bytecodes" 112. Some bytecodes may be integer bytecodes and other bytecodes may be floating point bytecodes. Bytecodes 112 may be provided to the JVM 108, compiled by compiler 110 and provided to the JSM 102 and/or MPU 104 for execution therein. In accordance with a preferred embodiment of the invention, the JSM 102 may execute at least some, and generally most, of the Java bytecodes. When appropriate, however, the JSM 102 may request the MPU 104 to execute one or more Java bytecodes not executed or executable by the JSM 102. In addition to executing Java bytecodes, the MPU 104 also may execute non-Java instructions. The MPU 104 also hosts an operating system ("O/S") (not specifically shown) which performs various functions including system memory management, the system task management that schedules the JVM 108 and most or all other native tasks running on the system, management of the display 114, receiving input from input devices, etc. Without limitation, Java code may be used to perform any one of a variety of applications including multimedia, games or web based applications in the system 100, while non-Java code, which may comprise the O/S and other native applications, may still run on the system on the MPU 104.

The JVM 108 is generally coupled to the compiler 110 and the JSM 102. Functionally, the JVM may include a class loader, bytecode verifier, garbage collector, and a bytecode interpreter loop to interpret the bytecodes that are not executed on the JSM processor 102.

Figure 4:
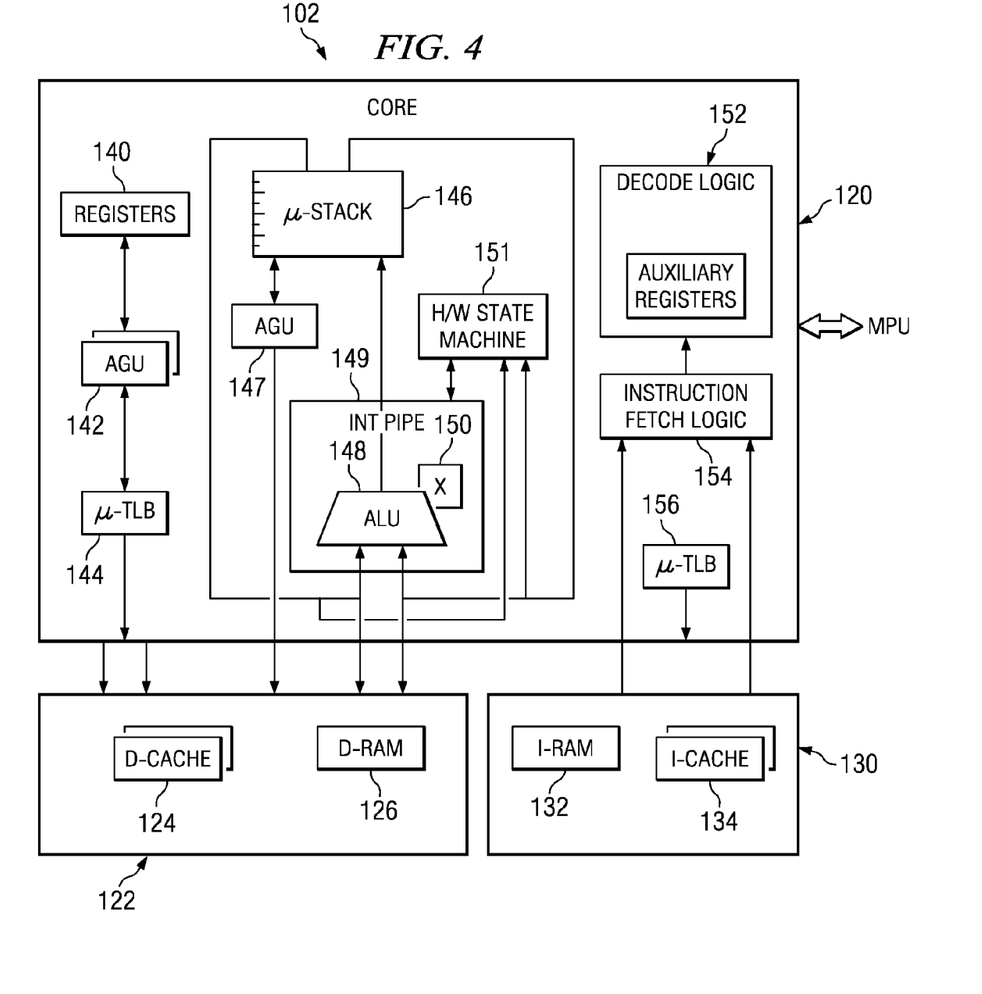
FIG. 4 shows a block diagram of the JSM of FIG. 1 in accordance with preferred embodiments of the invention.

FIG. 4 shows an exemplary block diagram of the JSM 102. As shown, the JSM includes a core 120 coupled to data storage 122 and instruction storage 130. The core may include one or more components as shown. Such components preferably include a plurality of registers 140, three address generation units ("AGUs") 142, 147, micro-translation lookaside buffers (micro-TLBs) 144, 156, a multi-entry micro-stack 146, an integer pipeline 149, a hardware state machine 151, decode logic 152, and instruction fetch logic 154. In at least some embodiments, the integer pipeline 149 comprises an arithmetic logic unit ("ALU") 148 and a multiplier 150. In general, operands may be retrieved from data storage 122 or from the micro-stack 146 and processed by the ALU 148, while instructions may be fetched from instruction storage 130 by fetch logic 154 and decoded by decode logic 152. The address generation unit 142 may be used to calculate addresses based, at least in part, on data contained in the registers 140. The AGUs 142 calculate addresses for certain types of instructions that are capable of accessing memory. The AGU 147 couples to the micro-stack 146 and may manage overflow and underflow conditions in the micro-stack preferably in parallel. The micro-TLBs 144, 156 generally perform the function of a cache for the address translation and contain memory protection information bits that are preferably under the control of the operating system running on the MPU 104.

Figure 5:
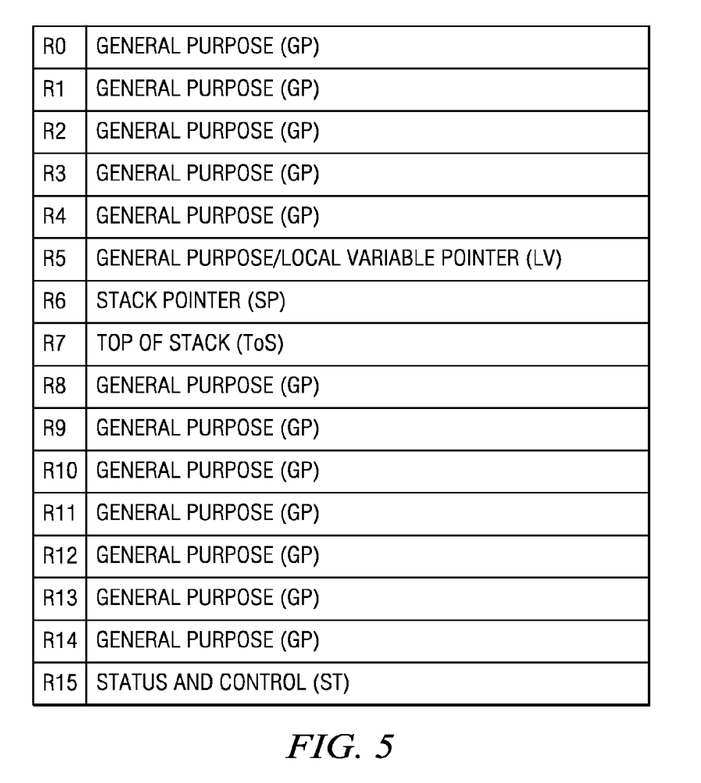
FIG. 5 shows various registers used in the JSM.

Referring now to FIG. 5, the registers 140 may include 16 registers designated as R0-R15. All registers are 32-bit registers in accordance with the preferred embodiment of the invention. Registers R0-R5 and R8-R14 may be used as general purpose ("GP") registers, thereby usable for any purpose by the programmer. Other registers, and at least one of the GP purpose registers, may be used for specific functions. For example, in addition to use as a GP register, register R5 may be used to store the base address of a portion of memory in which Java local variables may be stored when used by the current Java method. The top of the micro-stack 146 is reflected in registers R6 and R7. The top of the micro-stack has a matching address in external memory pointed to by register R6. The values contained in the micro-stack are the latest updated values, while their corresponding values in external memory may or may not be up to date. Register R7 provides the data value stored at the top of the micro-stack. Register R15 is used for status and control of the JSM 102.

Referring again to FIG. 4, the JSM 102 is adapted to process and execute instructions from a stack-based instruction set (e.g., Java). The stack-based instruction set may include Java Bytecodes. Unless empty, Java Bytecodes may pop data from and push data onto the micro-stack 146. The micro-stack 146 preferably comprises the top n entries of a larger stack that is implemented in data storage 122. Although the value of n may vary in different embodiments, in accordance with at least some embodiments, the size n of the micro-stack may be the top eight entries in the larger, memory-based stack. The micro-stack 146 preferably comprises a plurality of gates in the core 120 of the JSM 102. By implementing the micro-stack 146 in gates (e.g., registers) in the core 120 of the processor 102, access to the data contained in the micro-stack 146 is generally very fast, although any particular access speed is not a limitation on this disclosure.

The integer pipeline 149 executes at least a portion of an instruction in software. The ALU 148 of the integer pipeline adds, subtracts, and shifts data. The multiplier 150 may be used to multiply two values together in one or more cycles. The instruction fetch logic 154 generally fetches instructions from instruction storage 130. The instructions may be decoded by decode logic 152.

The data storage 122 generally comprise data cache ("D-cache") 124 anddata random access memory ("D-RAMset") 126. Reference may be made to copending applications U.S. Ser. No. 09/591,537 filed Jun. 9, 2000, Ser. No. 09/591,656 filed Jun. 9, 2000, and Ser. No. 09/932,794 filed Aug. 17, 2001, all of which are incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAM 132 may be used for various instruction sequences that are executed in place of, for example, a Java bytecode. The I-cache 134 may be used to store other types of Java bytecode and mixed Java/other instructions. Error handlers may also be stored in and executed from the I-RAM 132 and/or I-cache 134.

Figure 6:
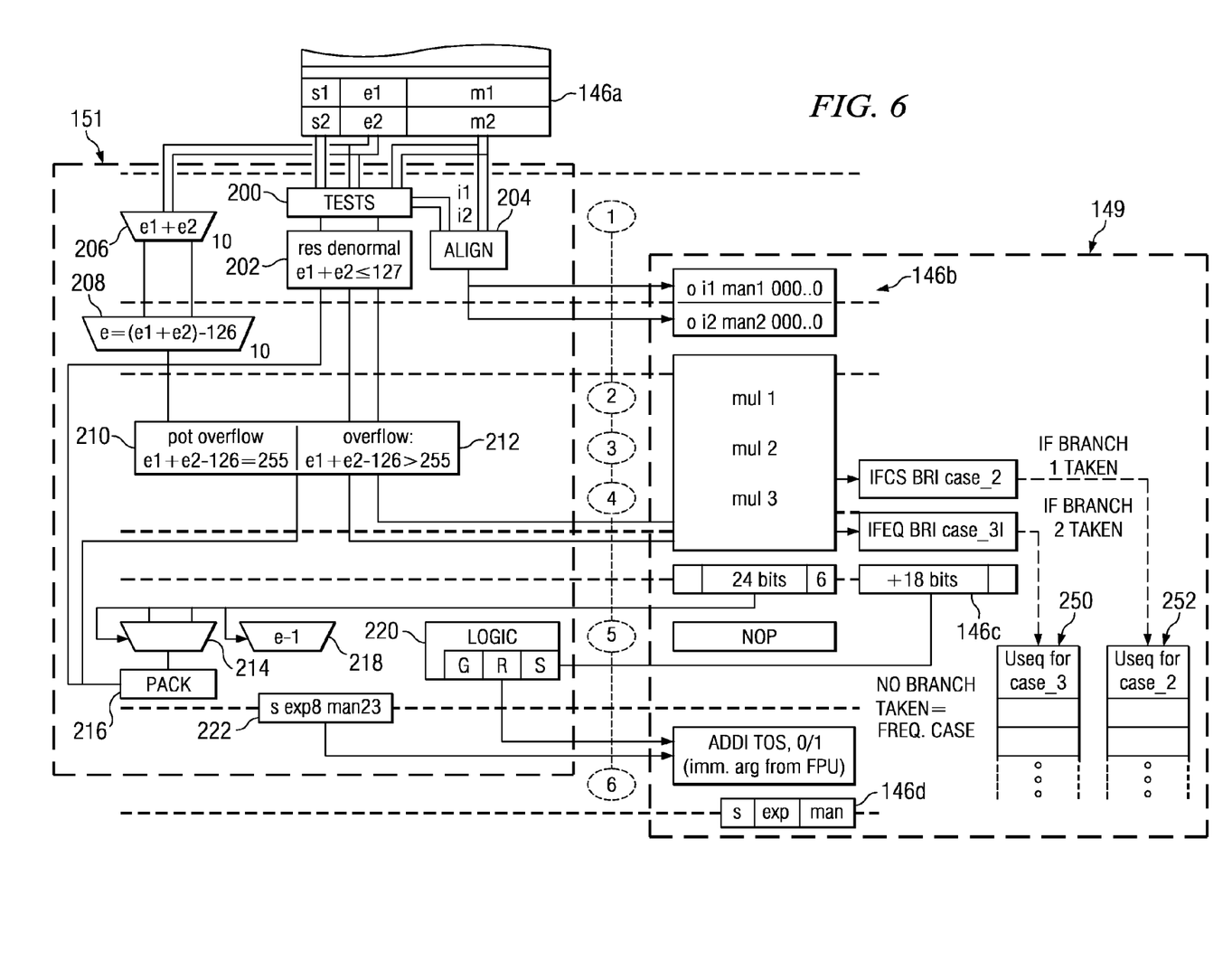
FIG. 6 shows an exemplary embodiment in which execution of a floating point multiply instruction is split between a small specialized hardware unit and software executed on the processor's generic integer pipeline.

FIG. 6 shows an embodiment of the invention for the execution of a floating point multiply instruction. The execution on the hardware state machine 151 (reference numeral 54 in FIG. 1) is shown in communication with software controlled execution 149 on the integer pipeline. The hardware state machine 151 is depicted with a variety of hardware logic blocks to perform various functions as described below. The integer pipeline 159 is depicted in terms of the functionality the software causes to be performed. The microstack 146 is used to provide the input values to the hardware state machine 151 and integer pipeline 149, to provide intermediate storage of various values during the execution of the floating point multiply instruction and to provide storage for the resulting value from the multiply. The microstack 146 is shown in various states as 146a, 146b, 146c, and 146d.

The data storage 122 generally comprises data cache ("D-cache") 124 and data random access memory ("D-RAMset") 126. Reference may be made to copending applications U.S. Ser. No. 09/591,537 filed Jun. 9, 2000, now U.S. Pat. No. 6,826,652, granted Nov. 30, 2004, Ser. No. 09/591,656 filed Jun. 9, 2000, now U.S. Pat. No. 6,792,508, granted Sep. 14, 2004, and Ser. No. 09/932,794 filed Aug. 17, 2001, now U.S. Pat. No. 6,789,172, granted Sep. 7, 2004, all of which are incorporated herein by reference. The stack (excluding the micro-stack 146), arrays and non-critical data may be stored in the D-cache 124, while Java local variables, critical data and non-Java variables (e.g., C, C++) may be stored in D-RAM 126. The instruction storage 130 may comprise instruction RAM ("I-RAM") 132 and instruction cache ("I-cache") 134. The I-RAM 132 may be used for various instruction sequences that are executed in place of, for example, a Java bytecode. The I-cache 134 may be used to store other types of Java bytecode and mixed Java/other instructions. Error handlers may also be stored in and executed from the I-RAM 132 and/or I-cache 134.

The hardware state machine 151 also comprises overflow logic comprising logic blocks 210 and 212. Overflow logic 210 detects the situation where rounding up may cause the result to overflow, while overflow logic 212 detects the situation where overflow is certain independently of the rounding. The test logic 200 and the test logic 202 indicate exceptional cases where the parallel hardware-software execution mode is abandoned and the execution continues with pure software exception handler 250 or 252. This is an advantageous way of dealing with the cases where denormalized arguments or denormalized result requires a variable-sized shift to be performed.

The hardware state machine 151 also contains pack logic comprising multiplexer 214, adder 218, which may be physically the same adder as 206, and pack logic unit 216. Such hardware blocks form the final result by packing the sign, mantissa and exponent information computed in the previous cycles into a single 32-bit word. Logic 220 comprises rounding logic that detects the need for rounding up. Register 222 represents the final floating point answer before rounding.

The integer pipeline 149 interacts with and is synchronized to the hardware state machine 151. The operation of the logic depicted in FIG. 6 to perform a floating point multiply will now be described. The preferred embodiment of the floating point multiply generally takes 6 clock cycles shown in FIG. 6 as circled numbers. After the hardware state machine 151 tests the exponents and performs alignment if needed in cycle 1, the integer pipeline is activated and starts to perform the sequence of instructions needed. At this point, the microstack (state 146b) contains the aligned mantissas (m1 and m2) completed with the implicit bits. The integer pipeline then begins to perform the multiplication process in cycles 2-4. At the end of cycle number 4, the microstack comprises the product of the mantissas (state 146c). Generally, in cycle 3, the hardware state machine checks for the overflow conditions noted above. In cycle 5, the hardware state machine performs packing and rounding detection operations. To maintain the integer pipeline 149 synchronized to the hardware state machine 151, the integer pipeline includes a no operation ("NOP") to effectively introduce a delay in the pipeline while the hardware state machine is performing packing and rounding detection. The NOP preferably is inserted in cycle number 5 of 6. Finally, in clock cycle number 6, the integer pipeline performs an integer add to add the value one or zero to the top of the stack to complete the rounding as detected in 220. The resulting floating point product is then pushed back on the stack at state 146d. This is the execution flow in the majority of cases. If the rare cases requiring the variable-sized shift are detected in 200 or 202, the control is transferred to a software sequence 250 or 252 depending on the test results.

Figure 7:
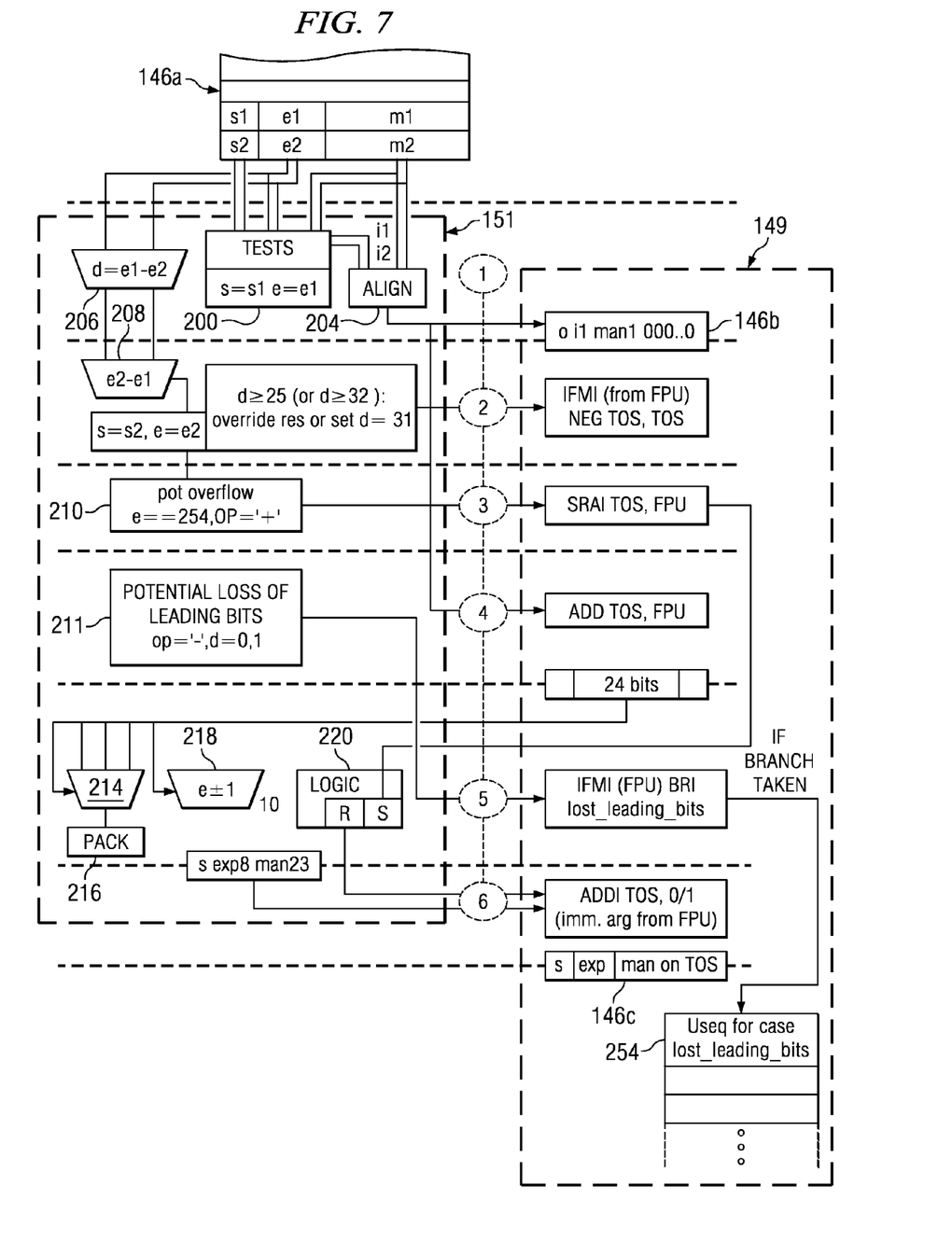
FIG. 7 shows an exemplary embodiment in which execution of a floating point add instruction is split between a small specialized hardware unit and software executed on the processor's generic integer pipeline.

FIG. 7 shows an embodiment of the invention for the execution of a floating point add instruction. Those logic blocks that perform the same or similar function as blocks in FIG. 6 use the same reference numerals as in FIG. 6. The input operands are popped from the microstack as shown at state 146a and added together by a combination of hardware 151 and integer pipeline 149 (on which software executes). Microsequence 254 is used for the case in which the leading bits are lost as determined in the integer pipeline in clock cycle 5. The example of FIG. 7 shows that the floating point add is generally performed in six clock cycles with each clock cycle involving operation of the hardware state machine, integer pipeline or a combination thereof. The integer pipeline in the example of FIG. 7 is responsible for adding or subtracting the two floating point mantissas after having shifted to the right the one corresponding to the smaller floating point argument and finalizing the rounding operation by adding one or zero to the packed floating point value. These operations are performed based on test information from the hardware state machine.

Figure 8:
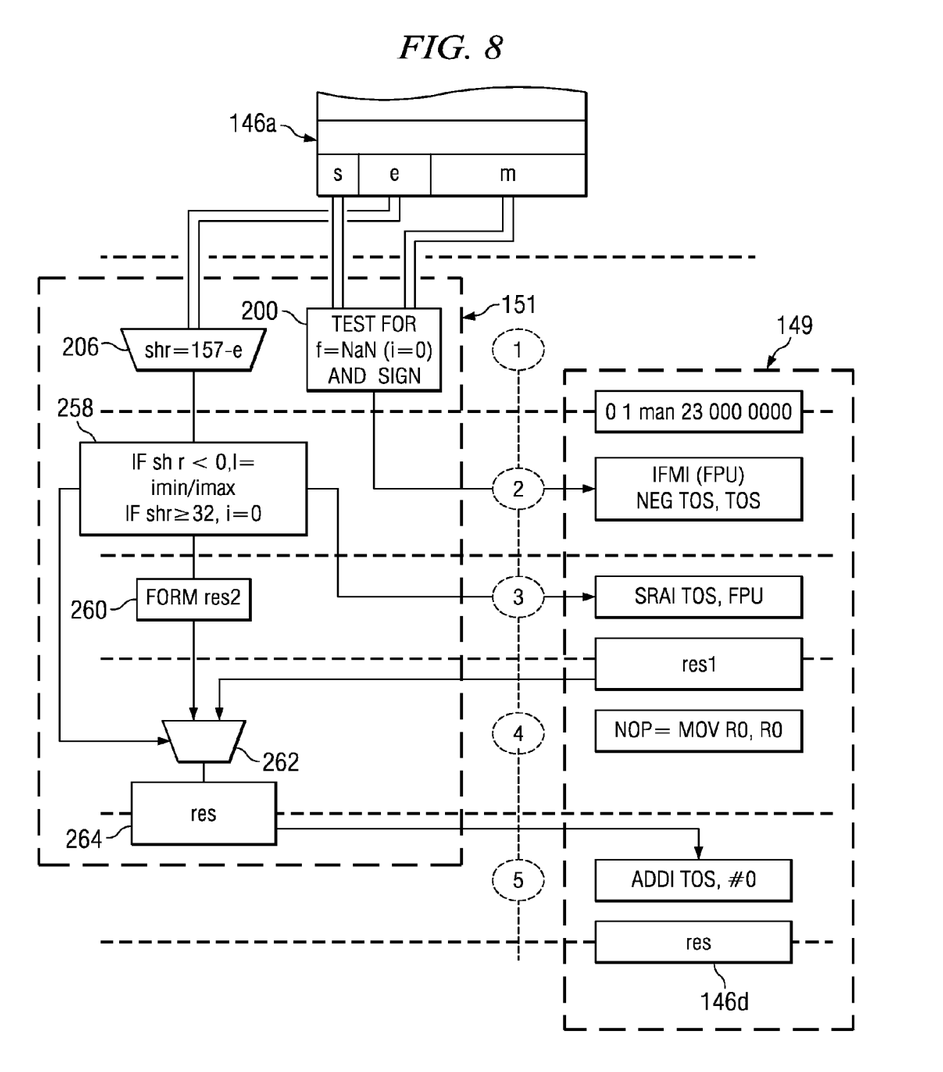
FIG. 8 shows an exemplary embodiment in which execution of an instruction that converts a floating point number to an integer number is split between hardware and software.

FIG. 8 shows an embodiment of the invention for the execution of a floating point-to-integer conversion instruction. The hardware state machine 151 comprises logic blocks 200, 206, 258, 260, 262, and 264. Test logic 200 tests for a Not A Number (NaN) argument and the sign information. Logic block 206 computes the size of the shift needed in the mantissa. Logic block 258 tests for integer range overflow and underflow. Block 260 sets the result to ±infinity or 0 in these cases. Blocks 262 and 264 choose the right result corresponding to over/underflow or the general result provided by the software and write the appropriate answer, respectively. The integer pipeline performs the various actions shown. Specifically, the integer pipeline shifts the mantissa provided by the hardware in cycle 1 by the needed amount and pushes the final answer on the top of the stack. A NOP is inserted as shown to maintain synchronization with the hardware state machine. The result is shown at the microstack state 146d.

Figure 9:
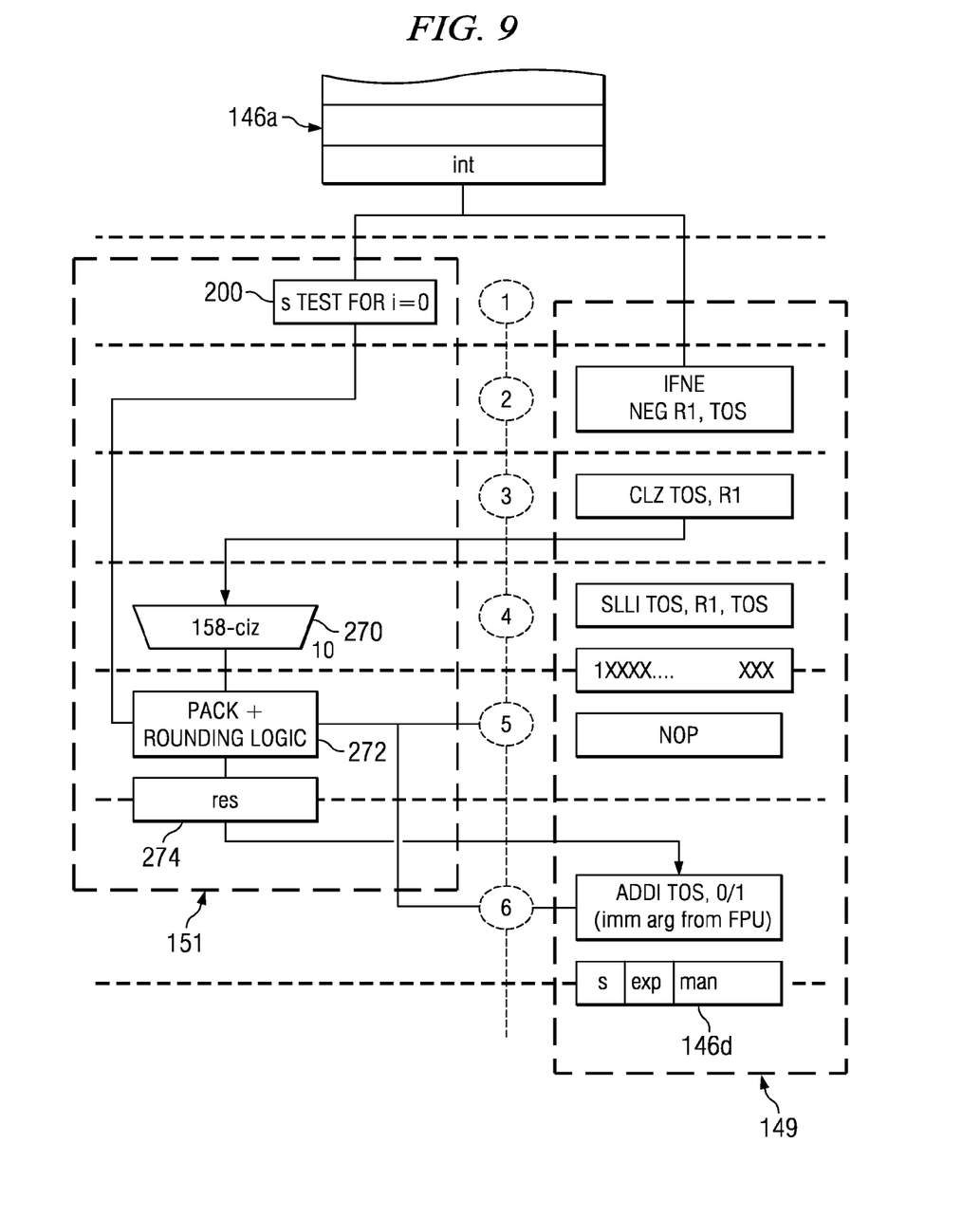
FIG. 9 shows an exemplary embodiment in which execution of an instruction that converts an integer number to a floating point number is split between hardware and software.

FIG. 9 shows an embodiment of the invention for the execution of an integer-to-floating point conversion instruction. The input value is the "int" value in the microstack state 146a. The output value is an equivalent floating point number in the microstack state 146d. The hardware state machine 151 comprises test logic 200 (to test for the sign of the input and the special value 0), logic 270 to compute the biased exponent value, and logic 272 to test for rounding and pack the result in register 274. The integer pipeline performs the various actions shown. Specifically, the integer pipeline complements the input value if needed, finds the size of and implements the necessary shift for the input and finalizes the rounding by adding 0 or 1. A NOP is inserted at cycle number 5 of 6 as shown to maintain synchronization with the hardware state machine.

Figure 10:
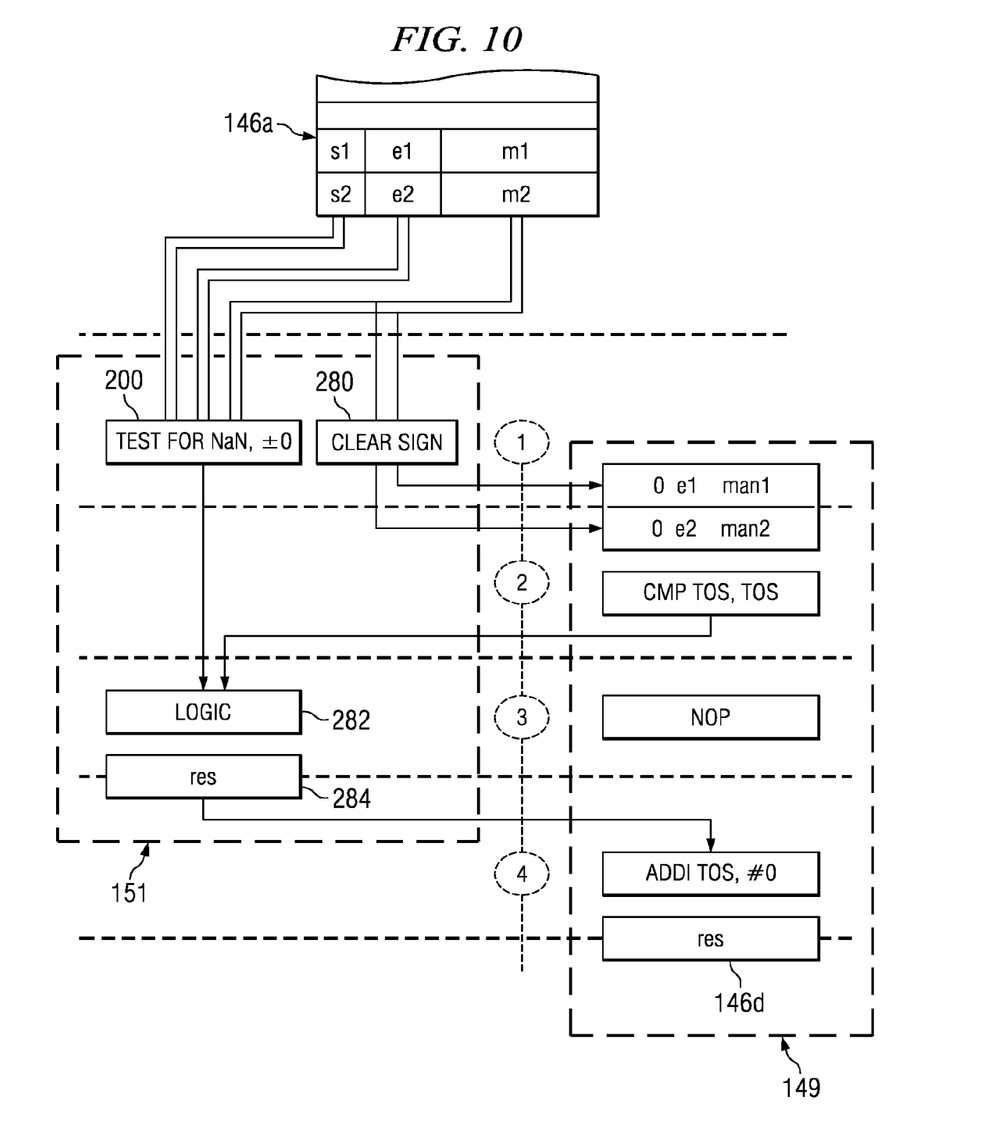
FIG. 10 shows an exemplary embodiment in which execution of a floating point compare instruction is split between hardware and software.

FIG. 10 shows an embodiment of the invention for the execution of a floating point compare instruction. The input values to be compared are shown in the microstack at state 146a. The output value represents the integer −1, 0 or 1 depending on whether input 1 is greater than, equal to or smaller than input2, respectively, and is shown at state 146d. The hardware state machine comprises logic blocks 200, 280, 282, and 284. Test logic 200 tests for the special values ±0 and Not-a-Number (NaN). Clear sign logic 280 sets the sign bit of the inputs to zero before making the values available for the software. Logic 282 forms the result 284 based on the test 200 and the result of the software compare instruction in cycle 2. The integer pipeline performs the various actions shown. Specifically, the integer pipeline performs an integer compare operation in cycle 2 and writes the result on the stack in cycle 4. A NOP is inserted as shown at cycle number 3 of 4 to maintain synchronization with the hardware state machine.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above. Each and every claim is incorporated into the specification as an embodiment of the present invention.

What is claimed is:

1. A processor, comprising:
   fetch logic that fetches instructions;
   a hardware stack;
   an integer pipeline; and
   a hardware state machine that is separate from and interacts with the integer pipeline,
   wherein a floating point instruction in the instructions is executed by coordinating execution of a sequence of software instructions in the integer pipeline with a plurality of operations performed by the hardware state machine, wherein the coordinating includes sharing intermediate results between the plurality of operations and the sequence of software instructions on the hardware stack, wherein the floating point instruction is a floating point add instruction, and wherein mantissa addition is executed in the integer pipeline and the plurality of operations performed by the hardware state machine includes testing of exponents, testing for overflow and underflow conditions, packing, and rounding detection.

2. The processor of claim 1, wherein the sequence of software instructions is initiated by decoding the floating point instruction.

3. The processor of claim 1, wherein the coordinating further includes passing one or more intermediate results between the integer pipeline and the hardware state machine via by-passes or a register file.

4. The processor of claim 1, wherein the plurality of operations performed by the hardware state machine includes at least one operation selected from a group consisting of extracting bit fields from input floating point values, testing the extracted bit fields for predetermined cases, rounding, and packing.

5. The processor of claim 1, wherein another instruction is a floating point instruction selected from a group consisting of a floating point multiply instruction, a floating point-to-integer conversion instruction, an integer-to- floating point conversion instruction, and a floating point compare instruction.

6. The processor of claim 1, wherein another instruction is a floating point multiply instruction, and wherein mantissa multiplication is executed in the integer pipeline, and the plurality of operations performed by the hardware state machine includes testing of exponents, testing for overflow and underflow conditions, packing, and rounding detection.

7. The processor of claim 1, wherein another instruction is an integer-to-floating point conversion instruction, and wherein mantissa shifting is executed in the integer pipeline, and wherein the plurality of operations performed by the hardware state machine includes determining the needed shift from an exponent, and rounding detection.

8. The processor of claim 1, wherein another instruction is a floating point compare instruction, and wherein integer comparisons are executed in the integer pipeline, and the plurality of operations performed by the hardware state machine includes testing for special values.

9. The processor of claim 1, wherein the processor is included in a cellular telephone.

10. The processor of claim 1, wherein the processor is coupled to an antenna.

11. The processor of claim 1, wherein another instruction is a floating point-to-integer conversion instruction, and wherein mantissa shifting is executed in the integer pipeline, and the plurality of operations performed by the hardware state machine includes testing of exponents.

12. A method, comprising:
fetching a floating point instruction; and
executing the floating point instruction by coordinating execution of a sequence of software instructions in an integer pipeline with a plurality of operations performed by a hardware state machine, wherein the coordinating includes sharing intermediate results between the plurality of operations and the sequence of software instructions on a hardware stack, wherein the floating point instruction is a floating point add instruction, and wherein mantissa addition is executed in the integer pipeline, and the plurality of operations performed by the hardware state machine comprises testing for overflow and underflow conditions, packing, and rounding detection.

13. The method of claim 12, wherein another instruction is an instruction selected from a group consisting of a floating point multiply instruction, a floating point-to-integer conversion instruction, an integer-to-floating point conversion instruction, and a floating point compare instruction.

14. The method of claim 12, wherein the plurality of operations performed by the hardware state machine includes at least one operation selected from a group consisting of extracting bit fields from input floating point values, testing the extracted bit fields for predetermined cases, rounding, and packing.

15. The method of claim 12, wherein another instruction is a floating point multiply instruction, and wherein mantissa multiplication is executed in the integer pipeline, and the plurality of operations performed by the hardware state machine includes testing for overflow and underflow conditions, packing, and rounding detection.

16. The method of claim 12, wherein another instruction is an integer-to-floating point conversion instruction, and wherein mantissa shifting is executed in the integer pipeline, and the plurality of operations performed by the hardware state machine includes determining the needed shift from an exponent and rounding detection.

17. The method of claim 12, wherein another instruction is a floating point compare instruction, and wherein integer comparisons are executed in the integer pipeline, and the plurality of operations performed by the hardware state machine includes testing for special values.

18. The method of claim 12, wherein another instruction is a floating point-to-integer conversion instruction, and wherein mantissa shifting is executed in the integer pipeline, and the plurality of operations performed by the hardware state machine includes testing of exponents.

* * * * *

UNITED STATES PATENT AND TRADEMARK OFFICE
CERTIFICATE OF CORRECTION

PATENT NO. : 7,574,584 B2
APPLICATION NO. : 11/186239
DATED : August 11, 2009
INVENTOR(S) : Chauvel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 877 days.

Signed and Sealed this

Seventh Day of September, 2010

David J. Kappos
*Director of the United States Patent and Trademark Office*